June 19, 1928.　　　　　　　　　　　　　　　　　　1,674,273
J. H. BARR
TYPEWRITER
Filed April 30, 1925　　　　4 Sheets-Sheet 2

INVENTOR.
JOHN H. BARR.
BY
Stockbridge & Borst
ATTORNEYS

INVENTOR.
JOHN H. BARR.

June 19, 1928.

J. H. BARR

TYPEWRITER

Filed April 30, 1925

INVENTOR.
JOHN H. BARR.

BY

ATTORNEYS

Patented June 19, 1928.

1,674,273

UNITED STATES PATENT OFFICE.

JOHN H. BARR, OF ITHACA, NEW YORK, ASSIGNOR TO BARR-MORSE CORPORATION, A CORPORATION OF NEW YORK.

TYPEWRITER.

Application filed April 30, 1925. Serial No. 26,850.

This invention relates to typewriting machines, and particularly to the mechanism for causing the printing, upon actuation of suitable keys.

An object of the invention is to provide an improved mechanism for transmitting motion between the type keys and the type bars; which will have a satisfactory, easily operated and snappy touch and action; which will provide proper acceleration for the type bars during the printing stroke; and with which the case shifting may be accomplished by shifting of the case segment and type bars carried thereby.

A further object is to provide an improved mechanism for accomplishing the above objects with which the various parts may be assembled and disassembled in a simple manner to facilitate not only the original assembly but the substitution or replacement of various parts during use; and in which the various parts and supports may be made largely from stamped and punched sheet material.

A further object is to provide an improved mechanism for transmitting motion between the keys and type bars and utilizing radially arranged type bars, with which the printing strokes of all of the keys will be uniform for uniform motions of the keys; and which will be relatively simple, practical, strong, durable, compact and relatively inexpensive.

Various other objects and advantages will appear from the following description of one embodiment of the invention, and the novel features will be particularly pointed out hereinafter in connection with the appended claims.

In the accompanying drawing:—

Fig. 6$^a$ is a sectional elevation of another form of the lever support shown in Figs. 4 to 6;

In the illustrated embodiment of the invention, the case segment 1, having a forwardly projecting bracket or portion 2, is mounted in an oblique or inclined position for movement in front of a suitable platen 3 to effect a variation in the case of printing. While the segment 1 may be mounted in any suitable manner in order to obtain this movement, it may conveniently be supported by a bail 4 and a link 5, the bail 4 being hinged to the side portions of the segment as at points 6, (only one of the points 6 being shown on the drawing) and the link 5 being hinged thereto adjacent the bottom central portion, as at 7. The bail 4 and link 5 are mounted upon suitable parts of the frame in turn for oscillation about axes 8 and 9 respectively. The segment serves in a sense as a connecting link between the free ends of the bail 4 and link 5. The arms of bail 4 and the link 5 are normally approximately perpendicular to the desired plane of movement of the segment, so that when given a limited movement between its two positions in which it prints in different cases, the segment will move in approximately a straight line.

Figures 1, 2:
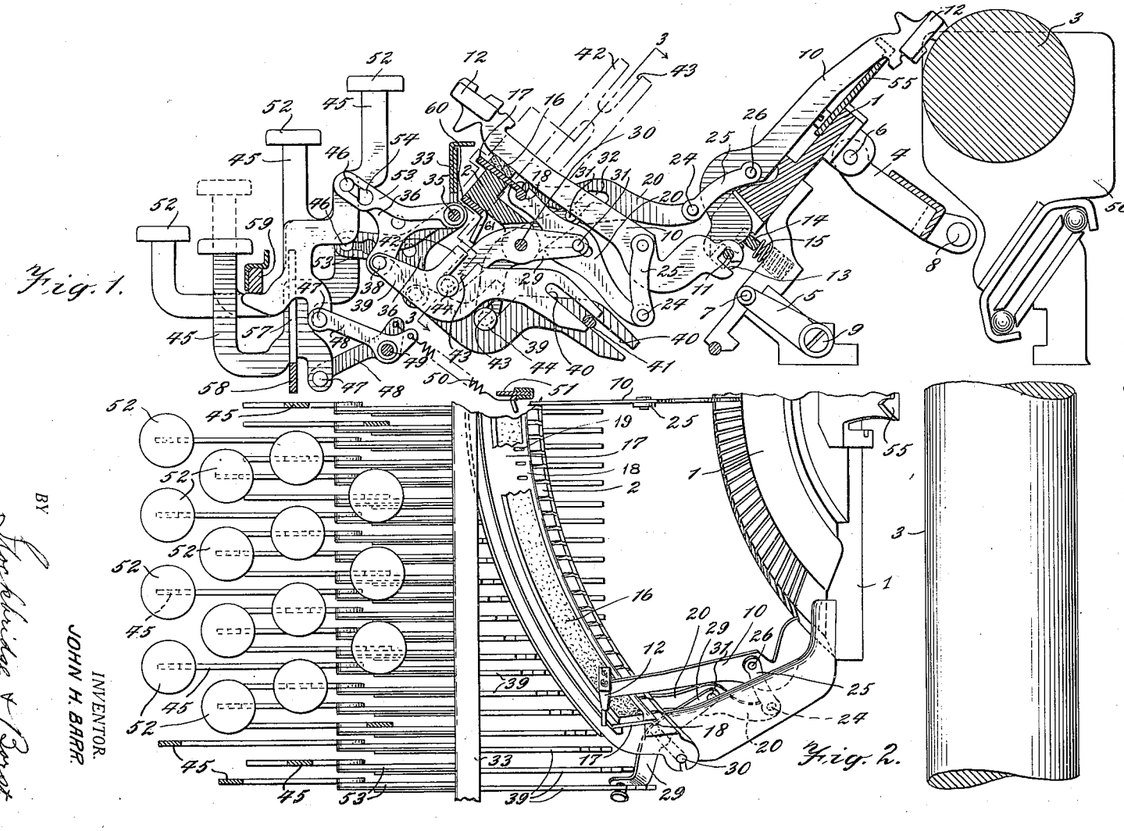
Fig. 1 is a longitudinal sectional elevation of a typewriting machine, showing a number of the keys at the center of the machine, and with the type bars positioned for printing in upper case position and with one of the printing bars actually in printing position.
Fig. 2 is a plan of part of the typewriter mechanism, with most of the type bars removed to better show the construction and arrangement of various details.
Figure 3:
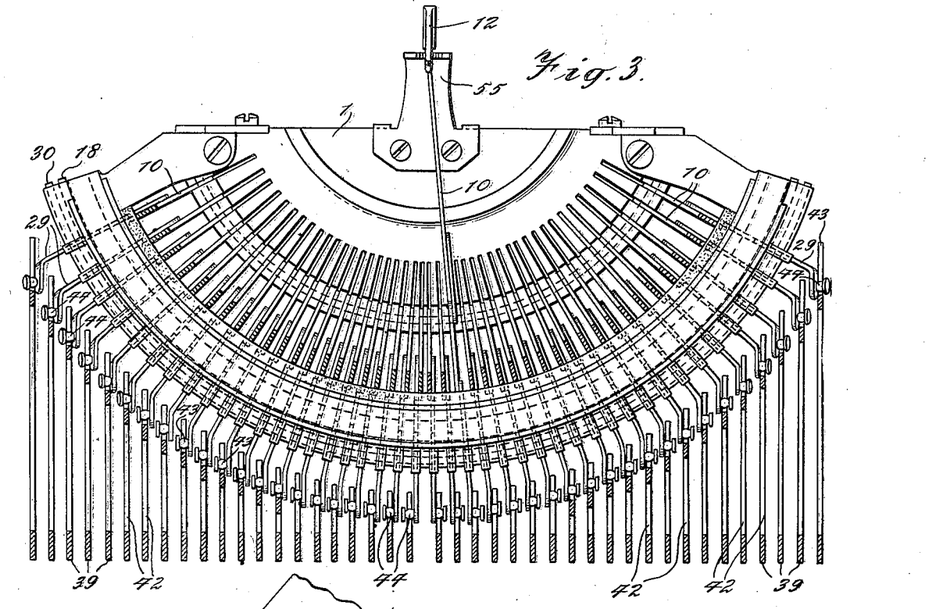
Fig. 3 is a sectional plan of a portion of the typewriter mechanism, the section being taken substantially along the line 3—3 of Fig. 1 and looking in the direction of the arrows.

A plurality of type bars 10 are arranged in radial planes about the segment and pivoted thereto in any suitable manner, such as upon a common pivot, wire or rod 11, and each type bar carries the usual type head 12 having printing characters thereon which engage with the platen 3 when the type bars are rotated into printing positions, one bar being shown in printing position in Figs. 1 and 3. Each type bar at its pivotal end may be provided with a somewhat L-shaped slot 13 (see Fig. 1), by means of which each type bar will be detachably hinged to the wire or rod 11, so that any type bar may be removed without removing all of the other type bars. A universal bar 14, guided by suitable means (not shown) to move parallel to itself, may be constantly and yieldingly urged by a spring 15 in a direction to engage and be moved by the heel of each type bar as it moves into printing position, and the nature of the slot 13 is such that a type bar cannot be removed from the wire or pivot rod 11 except when approximately or nearly in its printing position, and when released from the action of said universal bar 14. The universal bar 14 may be utilized to effect an operation of the carriage escapement in the usual or any suitable manner (not shown).

The bracket 2 which extends forwardly from the segment 1 carries a cushion 16 upon which the type bars may normally rest when in retracted or inactive positions. A plate 17 is secured upon this bracket 2, such as beneath the cushion 16, and at its edge toward the body of the segment is provided with a bead 18 which serves as a pivot support for levers utilized to actuate the type bars in a manner to be explained presently. In one form of the bead, which is illustrated in Figs. 1 to 6, it extends laterally beyond one face only of the plate 17, but it may extend from both faces, as in Fig. 6ª, the advantages of both of which will be explained hereinafter. The bead is preferably cylindrical except in the portion where it joins the body of the plate 17, and the plate 17 is provided along its length with a plurality of slots or apertures 19 (see Figs. 4 and 5) extending away from the bead 18 for some distance.

Figures 4, 5, 6:
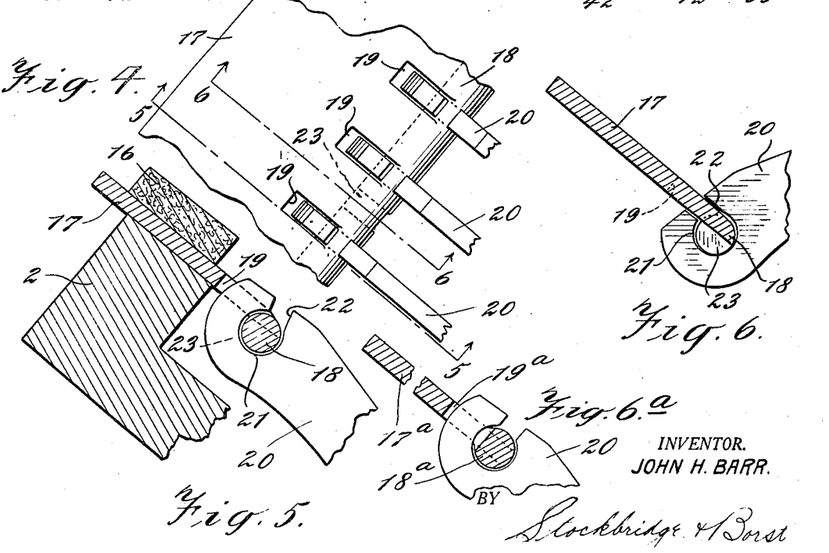
Fig. 4 is a sectional plan of a portion of the support for some of the levers used for operating the type bars.
Fig. 5 is a sectional elevation of the same, with the section taken substantially along the line 5—5 of Fig. 4.
Fig. 6 is another sectional elevation of the same, with the section taken substantially along the line 6—6 of Fig. 4, but with a lever in position for removal from the support.
Figure 7:
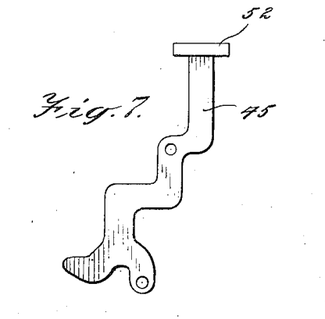
Figs. 7 to 10 are elevations of different key stems which may be employed for the different rows of keys.

The apertures 19 may be formed by cutting punches, and preferably will be so set that when the apertures 19 are cut, the die or tool will shear off a small section of the inner portion of the bead at the slot as shown in Fig. 6ª particularly, to avoid shaving off the bead at the slot sufficiently to form a cylindrical bearing.

A plurality of levers 20 (see Figs. 1, 4, 5, 6 and 16 particularly) are pivotally mounted upon said bead and in such slots 19, so that they may pivot freely upon the bead and pass through the slots 19. In order to place the levers 20 upon the bead 18, each lever is provided with a bearing aperture 21 of a size approximately corresponding to the size of the bead and, in addition, has an entrance slot 22 leading to the bearing aperture 21 and having a width at least equal to the thickness of the plate 17 where it joins the bead.

To apply one of the levers 20 to the plate 17, it is first moved into the relative position shown in Fig. 6, which is a position not occupied in any of its normal operative positions in the use of the typewriter, and in such position its entrance slot 22 will be aligned with the plate 17 when the aperture 21 is aligned with the bead 18. The lever, when placed at one end of the plate 17 in this position, may be passed lengthwise of the plate over the bead 18, during which movement the aperture 21 will pass along and surround the bead, and the entrance slot 22 will clear the faces of the plate 17.

After the lever 20 has been moved into the desired position along the plate 17, it is aligned with one of the slots 19, whereupon it may be swung about the bead as an axis into its desired angular, operative position. During this movement into operative position, the end of the lever will pass through the slot 19 as shown in Figs. 4 and 5, the bead serves as an ordinary pivot bearing for the levers, and the levers are held against endwise displacement by the sides of the slots 19. Any lever may be removed by a reverse of the operation just described.

After the machine has been assembled, whenever the removal of one of the interior levers 20 is desired, it would ordinarily be necessary to remove all of the other levers 20 to either side thereof. To avoid this necessity, the bead may be provided at a plurality of spaced points along its length with a plurality of kerfs 23 upon the portion projecting from the faces of the plate 17, so that the bead at those points will in thickness be merely an extension of the thickness of the plate 17. In such a case, it is merely necessary to move any lever 20 along the bead while in the angular position shown in Fig. 6, until it becomes aligned with one of the kerfs 23 whereupon it may be removed transversely of the plate 17, with the slot 22 passing through the kerf for release from the plate and bead as will be readily understood.

Replacement of the lever 20 may be made by moving it into the angular position shown in Fig. 6, in one of the kerfs 23, sliding the lever through the kerf into the position shown in Fig. 6, then moving the lever along the bead to the desired position where it may be swung upon the bead into the operative position such as shown in Fig. 5.

The plate 17 with the bead may be formed in a simple manner by the usual metal working processes and machines, and the slots 19 and kerfs 23 provided thereon in a simple manner. Where the bead projects only from one face of the plate 17, it is only necessary to provide a kerf 23 upon one face thereof and, therefore, but one kerfing operation is necessary. While the bead may be provided upon the plate 17 as in Fig. 6ᵃ so as to project laterally from both faces thereof, it would, in that case, be necessary to provide aligned kerfs upon both faces, and this would require the making of two machine operations at each desired point along the bead to form the kerfs upon both faces.

The form of plate 17 shown in Figs. 1 to 6 is particularly advantageous where the levers 20 may require removal or replacement at intervals. However, if the bead is symmetrical upon both faces of the plate, as the bead 18ᵃ of plate 17ᵃ of Fig. 6ᵃ, certain other manufacturing advantages may be obtained. For example, the drawing of the plate with its bead is more readily accomplished when the bead is symmetrical thereon, and when the apertures 19ᵃ are formed by the punching die or tool, the slight shearing of one side of the bead as at 18ᵇ in Fig. 6ᵃ to obtain a good bearing surface, as hereinbefore explained, reduces the cost of manufacture.

The levers 20 are levers of the third order and at their free ends are connected by pivot pins 24 to links 25, which are pivotally connected by pins 26 to the type bars 10 The levers 20 are arranged in radial planes similarly to the type bars and are preferably located in the planes of the type bars with which they coact, with the link 25 upon corresponding faces of the related type bars and levers. Each pin 26 immediately adjacent the link 25 is provided with a circular portion, serving as a pivot bearing, and at its extreme end with a projection 27, which makes the extreme end of the pin 26 non-circular in cross section for a purpose which will appear presently (see Figs. 16 and 17).

Figures 16, 17, 18, 19:
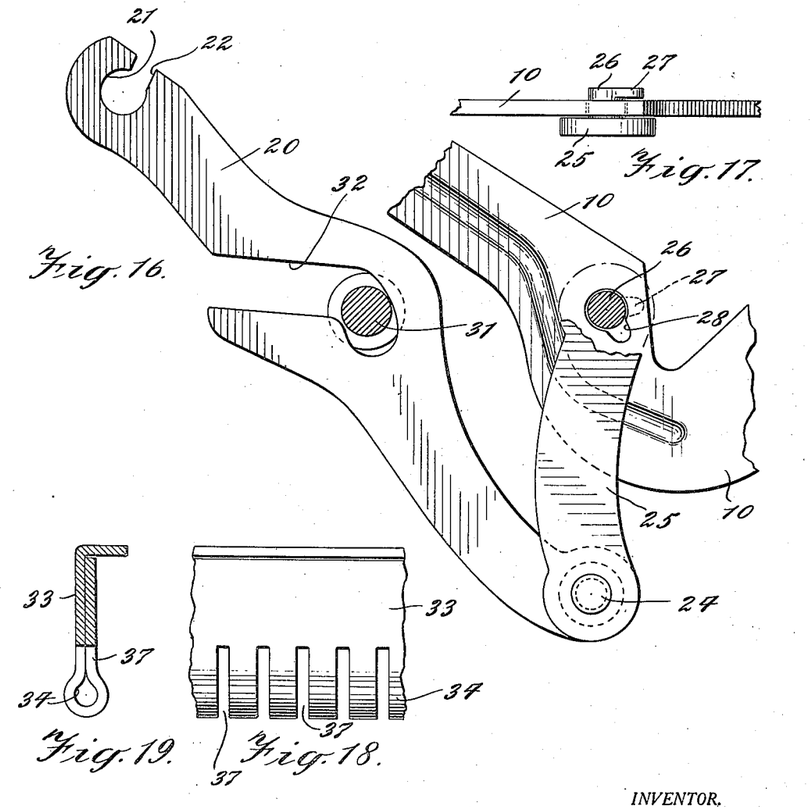
Fig. 16 is a sectional elevation of a portion of the machine, illustrating the connections between one of the operating levers and the type bar.
Fig. 17 is a plan of a portion of the structure shown in Fig. 16.
Fig. 18 is an elevation of another of the improved supports for a plurality of levers of the operating mechanism.
Fig. 19 is a transverse sectional elevation of the same.

The type bar 10 is provided with a non-circular aperture 28 in which the pin 26 is engaged for a pivotal connection. The aperture 28 corresponds in size and shape to the extreme non-circular end of the pin 26 so that the pin 26 may be passed through the aperture 28 until the non-circular end passes entirely through the type bar as shown in Fig. 17, and the circular part lies within the aperture 28. The type bar may then be rotated upon the pin 26 to carry the extension 27 which makes the pin 26 non-circular, out of alignment with the corresponding part of the aperture 28 of the type bar, the type bar pivoting freely upon the circular or bearing portion of the pin 26. In this condition, the type bar will be held against endwise displacement on the pin 26 by the non-alignment of the non-circular end of the pin and the non-circular aperture of the type bar. That is, the extension 27 of the end of the pin 26 will move over a face of the type bar and prevent its displacement by reason of its overhang.

The aperture 28 and the pin 26 are so provided upon their respective parts that they will not be in alignment in the ordinary positions which they will assume in the operation of the type bar from the lever 20. The connection between the type bar and link 25 will be made or broken while either the type bar or the lever 20 is disengaged from its pivotal support, so that the type bar and link 25 may be given angular positions which will bring the non-circular end of the pin 26 into alignment with the aperture 28. For example, after the assembly is made, in order to disconnect the type bar from its actuating device the type bar will first be disengaged from it pivot rod 11 and then it can be moved into such a position relatively to the link 25 that the pin 26 will be aligned with the aperture 28 to permit of disengagement of the type bar from the link 25.

Upon the forward bracket 2 of the segment 1, a plurality of levers 29 of the first order are pivotally mounted on a common pivot 30, in radial planes generally below and slightly forwardly of the levers 20. Each lever 29 at the end toward the levers 20 carries a pin 31 which runs in a slot 32 in a lever 20. Each lever 29 is preferably positioned upon the same face of the lever 20 to which it is connected, as the link 25 which is connected to the same lever, so that while the lever 20 will be in the plane of its type bar, the link 25 and lever 29 which are connected to the same lever 20 will be in the same plane with one another, and the effective thickness of the combined levers and linkage for any type bar will be merely the combined thicknesses of a lever 29 and a lever 20.

The slot 32 in each lever 20 is angular and somewhat L-shaped, with the inner end of the slot extending generally in a direction lengthwise of the lever 20, and the entrance part of the slot obliquely to the length of the lever. The shape of the slot is such that an easy starting of the type bar will be possible and be followed by an accelerated movement of the type bar. This is of considerable advantage in providing a satisfactory action for the motion transmitting elements.

When a type bar and its actuating mechanism are in normal positions, the pin 31 of the actuating lever 29 will be in the inner angular end of the slot 32, that is in the end of the slot which extends in a direction generally lengthwise of the lever 20. In these relative positions the pin 31 acts somewhat as a lock in holding the lever 20 in that position with a consequent reduction in the tendency of any type bar to rebound from the cushion 16.

A bearing element 33 having at its lower end a tubular passage 34 is secured across the frame of the machine in front of the bracket 2 of the segment 1. A rod or wire 35 is passed longitudinally through the bearing passage 34 to serve as a hinge or pivot support for a plurality of levers 36 which extend forwardly of the machine. The bearing element 33 is provided along the edge of the tubular passage 34 with a plurality of slots 37 in which the levers are received sufficiently to permit them to be pivotally mounted upon the common pivot wire 35.

The bearing element 33 may conveniently be formed from sheet metal in a manner to be now described. A strip of sheet metal is provided intermediate of its edges with a plurality of slots, corresponding to the slots 37 but having rather more than double the length thereof, spaced apart in a row in the manner shown in Fig. 18. This strip of metal is then bent lengthwise of itself upon a line crossing the slots 37, so that the slots or apertures in the strip will form the slots or apertures 37 upon the completion of the folding as shown in Figs. 18 and 19. During the folding, the edge at the line of fold will be made approximately tubular to provide the bearing passage 34. It will thus be observed that the bearing element may be formed by merely stamping it of the desired shape, and having the apertures which, when the strip is folded lengthwise as shown in Fig. 19, will form the slots 37 in which the levers are received.

Each lever 36 is pivotally connected by a pin 38 to one end of a driving member 39, and the other end of the driving member 39 is provided with a longitudinally elongated slot 40 opening from the end and sliding upon a cross bar or rod 41. All of the driving members 39 may be guided upon a common rod or bar 41 which extends transversely between the side frame members of the machine. When a driving member 39 is operated, it will have a substantially rectilinear motion, in that the slotted end will be guided in a substantially rectilinear motion by reason of its sliding engagement with the rod 41, and since its other end is moving in an arc which is nearly parallel to the slot in the other end, the pivoted end of the member will move in nearly a straight line. The result is that for limited driving movements, the driving member will have a combined arcuate and rectilinear motion which will be almost entirely, that is approximately, rectilinear. The driving member will be restrained against lateral displacement by suitable means such as a comb (not shown) similar to the bearing element 33.

Figure 11:
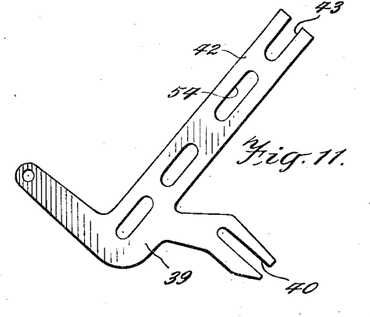
Figs. 11 and 12 are elevations of two different examples of driving members which are employed in the actuation of the type bars.
Figure 12:
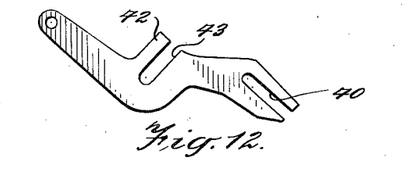
Figure 13:
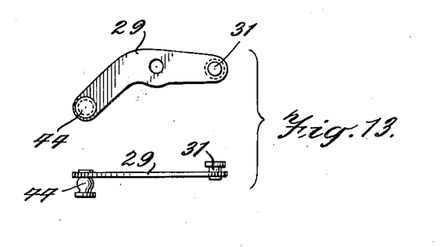
Fig. 13 represents an elevation and plan of one of the levers employed for actuating the type bars in the central part of the segment.
Figure 14:
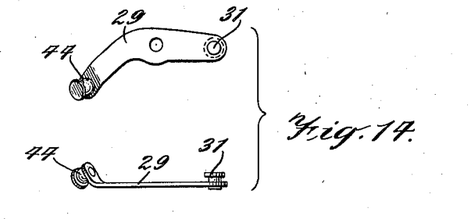
Fig. 14 is a similar elevation and plan of another lever of the same type for actuating the type bars at the sides of the segment.
Figure 15:
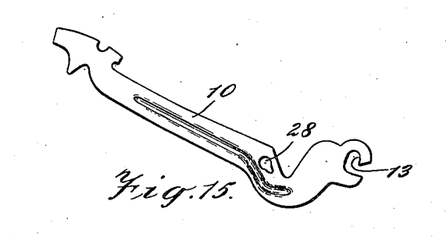
Fig. 15 is an elevation of one of the type bars.

All of the driving members 39 are similarly mounted and similarly formed except that each member has a laterally projecting portion or arm 42 which varies in length from a minimum for the driving members at the center of the segment to a maximum at the sides. These two extremes are shown in Figs. 11 and 12, the extreme side driving member being shown in Fig. 11 and one of the central ones in Fig. 12. Each driving member is provided with a slot 43 in the free end of its laterally extending arm for a purpose which will appear presently.

The driving members are preferably mounted so as to extend in an inclined direction forwardly and upwardly, and the arms 42 will extend up beneath the arcuate bracket 2 of the segment 1 to different extents, so that the slotted end of each arm 42 will lie immediately adjacent one of the levers 29 which is carried by the bracket of the segment. The levers 29 are all of the same length, but the forwardly and downwardly projecting operating arms will be bent angularly as shown clearly in Figs. 2 and 3 into a plane substantially parallel to the adjacent operating arm 42 of a driving member, the degree of angularity of the bend varying from a maximum in the levers at the sides of the segment to no bend at the center, as will be observed from Fig. 3.

Each angular or bent end of the lever 29 is provided with a headed pin 44, the shank of which is received within and slides along the slot 43 of the corresponding arm of a driving member, which is also shown clearly in Fig. 3. The shank of each pin 44 is preferably made somewhat barrel-shaped so that an efficient rocking action in the slot 43 may occur without too much lost motion and without binding.

It will be observed that whenever any driving member is given a substantially rectilinear motion by a movement of its lever 36, it will, through its arm 42 and the pin 44, operate one of the levers 29 which will in turn through the mechanism described hereinbefore move its associated type bar into printing position against the platen 3. Inasmuch as the levers 29 at the extreme sides of the segment will have a greater arcuate movement, relative to the plane of movement of the driving member than the center ones, the lever ends carrying the pins 44 may, at the ends or sides of the segment, be also bent slightly laterally as shown in Fig. 3, the degree or extent of this lateral bending decreasing toward the center of the segment.

A key stem 45 will be pivotally connected by a pin 46 to the lever 36 and at another point by a pin 47 to a pivoting guiding arm or link 48 which is pivoted on a suitable support 49. Thus, whenever the stem 45 is depressed, it will rock the lever 36 and arm or link 48. The stem when depressed, will be guided in its path in a substantially vertical direction by the lever 36 and arm or link 48 with very little lateral movement, and, in being depressed, the lever 36, which is operated, will transmit this movement to the connected driving member 39. A spring 50 is connected under tension to each arm or link 48 and to a suitable anchorage bar 51 on the machine frame, so that it will be additionally tensioned whenever any key stem is depressed, and will return the key stem to its upper position when released. Each key stem 45 will have the usual key head 52 carrying the suitable designating characters as usual in typewriting machines.

The end of the pin 46 which projects from the stem 45 is preferably undercut or circumferentially grooved where it projects through the lever 36, and a locking strip 53 is provided with a keyhole aperture 54 which fits over the undercut head to lock the lever 36 against removal therefrom. The larger end of the keyhole slot is of sufficient size to pass over the head of the pin 46, and the smaller end of the slot 54 is made narrower than the diameter of the head of the pin 46 but larger than the diameter at the undercut portion, so that after the larger end of the slot has been passed over the head of the pin, the strip 53 may be drawn endwise to carry the narrower end of the slot beneath the undercut head, which effectively locks the lever to the stem pin 46.

The strip 53, when in locking position as shown in Fig. 1, is preferably extended to the pivot rod 35 and provided with an aperture through which the rod 35 passes. Thus, when the lever 36 is mounted upon the rod 35, the locking strip 53 will be held in its locking position, so that the lever 36 cannot be disconnected from the key stem. In order to disconnect a lever 36 from its key stem, the rod 35 must first be moved to release the locking strip 53, which may be then moved to disengage itself from the pin 46 and release the lever 36 for removal from the pin 46. When it is reconnected, the locking strip will be applied as shown in Fig. 1 and the rod 35 passed through the end of the same to lock it against movement except with the lever 36.

Inasmuch as the plurality of the levers 36 with their locking strips 53 are mounted upon the common rod or wire support 35, the problem arises of removing any intermediate lever 36 or the locking strip 53 of the same without removing all the levers. In accordance with this invention, whenever it is desired to remove a lever 36 or a locking strip 53 of any lever, the wire or rod 35 may be pushed endwise in the tubular bearing of the element 33 by another rod or wire which is inserted into the tubular bearing to pass through and engage and hold the levers as fast as they are disengaged from the previous rod or wire 35. One rod or wire 35 is therefore pushed endwise by another similar rod or wire until the abutting ends between the two are positioned at any lever 36 or its locking strip 53 which one desires to remove. A slight separation of the two abutting wires or rods 35 will then release that particular lever or its locking strip for removal or replacement without releasing any of the other levers. After the release or replacement, one rod 35 may be pushed entirely through the tubular bearing in the element 33 to retain all of the levers upon the same wire.

Figure 8:
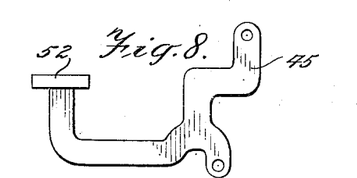
Figure 9:
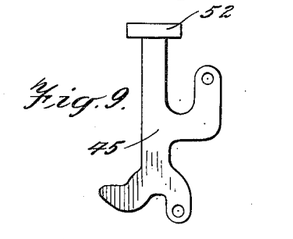
Figure 10:
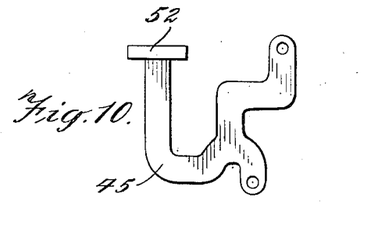

It is desirable that the head carrying arms of the key stems 45 be arranged at different positions thereon so that they may be assembled in rows which are arranged in a step-like relation in front of one another, as usual in typewriters. These various forms of the key stems 45 are shown in Figs. 7 to 10. Thus in Fig. 7, the key stem illustrated is that employed for the rearmost row of keys, the stem shown in Fig. 9 is that used for the next row next in front thereof. The stem shown in Fig. 10 is that used for the next forward row, and the stem shown in Fig. 8 is for the extreme forward row. All of these stems may be of stamped sheet metal as usual in typewriter construction.

The driving members having the longer arms 42, such as shown in Fig. 11 and used at each side of the center of the segment, are preferably provided with elongated apertures 54, to obtain lightness in the moving parts. A single set of dies may be used for blanking out all of the driving members and then the arm 42 of each may be cut off by a simple subsequent operation to the desired length, the slot 43 for connection to the lever 29 being then formed in the end thereto. The segment 1 may have the usual or any suitable guiding element 55 for the type bars 10 as the latter move into printing position, so that each type bar will always print at the desired point upon the platen.

The platen is mounted in a suitable carriage 56 which may be moved transversely of the machine to expose new printing surfaces to the action of the type bars, any suitable mounting for permitting this motion of the carriage being provided and not forming, per se, a part of this invention. The key stems 45 may be guided in slots 57 of a guide plate or comb 58, and each stem has a portion engaging beneath a bumper 59 which extends transversely across the machine as usual in typewriter mechanism. The bumper 59 limits the upward movement of the stems under the action of the returning springs 50. It will also be understood that the type bars may be, and preferably are, mounted in radial slots in the segment so that they will always hold their proper alignment throughout their movements into and out of printing positions.

In order to cushion the return stroke of each type bar, a plate 60 is secured to the forward bracket 2 of the segment and provided along one edge with a plurality of spring teeth or arms 61, one tooth for each lever 29, each arm 61 being positioned for engagement by an individual lever 29 when the lever is at the end of its return stroke. The arms 61 are positioned to be struck by the levers 29 just slightly prior to the end of their return stroke so as to resiliently cushion the return stroke which lessens the noise of the type bars on their return to normal inactive positions. The spring arms 61 thus tend to limit or restrict the tendency for the type bars to rebound.

It will be noted that all of the key levers 36 are mounted on the same common pivot rod and since the levers 36 are of equal size, they will, when given equal angular movements, impart equal movements to the drivers. All of the levers 36 will be given equal movements for equal dips of the keys and, therefore, the driving strokes of all the driving members 39 will be uniform and equal.

In the operation of a typewriter constructed in accordance with this invention, whenever one of the key stems 45 is depressed, it will descend substantially vertically and in doing so, will tension the spring 50 which is connected to the guiding arm 48 that is operated by that key stem. The stem in descending will operate the lever 36 which in turn imparts to the driving member 39 a nearly rectilinear motion in a direction approximately perpendicular to the plane of movement of the segment in a case shifting operation. The driving member 39 in moving rearwardly will operate the lever 29 with which it is connected, and the latter by means of its cam pin 31 will operate the lever 20 and the latter through the link 25 will move the associated type bar in a direction radially of the segment into printing position against the platen 3, the type bar being guided in its radial movement by the slot in which it is pivoted and by the guiding plate 55.

As a type bar approaches its printing position, its heel portion engages and moves the universal bar 14 to control the escapement by which the platen is permitted to feed along under the action of the usual spring (not shown) to prevent fresh printing surfaces to the type. When the depressed key stem is released, the spring 50 will return it to its upper and normal position and retract the driving member, and the latter will return the type bar to its normal position of rest upon the cushion 16, it being understood that the spring 15 acting upon the universal bar will assist in starting the type bar upon its return travel. It will be observed, however, that in the printing stroke of the type bar, the pin 31 in actuating the lever 20 will move first in the angular inner end of the slot 32 in a direction nearly lengthwise of the lever 20, and then obliquely thereof in the other branch of the slot, and by reason of this, a variable acceleration of the type bar providing an easy starting action will be obtained.

In Fig. 1 the case segment is shown in the position in which it prints the upper case of letter, the segment being shifted downwardly for that purpose, and when it is desired to print in the lower case, the segment will be shifted upwardly to carry the lower type or printing character on each head 12 into printing position against the platen. It will be understood that the segment may be positioned to shift either upwardly or downwardly in changing from lower to upper case, and that suitable spring devices may be employed to normally hold the segment in the normal position. It will be also understood that suitable locking means may be employed for locking the segment in either position.

The type bars and levers 20 and 29 are all carried by the segment for movement therewith in the case shifting operation, and during the movement of the segment in effecting a change of case, the pins 44 on the levers 29 will slide freely in the slots 43 of the driving members without operating the type bars, because the slots 43 extend substantially parallel to the direction in which the segment moves in the case shifting operation. To avoid unnecessary clearance between the pins 44 and the slots 43 of the driving members, the slots 43 are preferably made arcuate so as to be substantially parallel to the slightly arcuate travel of the segment in its case shifting movements. By means of this pin and slot connection between the operating levers for the type bars and the driving members, the connection between the key stems and the type bars will not be interrupted in either case position of the segment, and the stroke of the keys will not be varied by a change of the segment from one case position to the other.

It will be noted that all the driving members 39 are given equal movements upon the depression of any key and since all points of each driving member partake of the same extent of movement, the levers 29 will all be given equal extents of movement upon the actuation of their key. This is true even though the pins 44 of some of the levers 29 are connected to the longer arms 42 of the driving members.

Inasmuch as the levers 20 and 29 are carried by the segment, they may be disconnected as a unit from the driving members by a mere removal of the segment with the parts carried thereby, in which case the pins 44 all move out of the slots 43 of the driving members, at the same time. They may be reassembled by a similar, but reversed, operation. This has the advantage of permitting a separate unit assembly of the parts carried by the segment, and the driving members and the key stems, after which these units may be assembled in their proper relations to one another.

It will be observed that with this construction, any type bar may be readily removed by merely disconnecting it from the segment and the link 25 which operates it, and any link 20 may be readily removed by first rotating it into the angular position shown in Fig. 6, relatively to the plate 17, the details of which have been hereinbefore described. It will also be observed that the stroke of all keys and type bars will be uniform regardless of their position in the machine or in the case position of the segment, and none will require greater effort for operation than the others. The particular mountings for the levers 20 and 36 are very simple and easily made, so that a very inexpensive and practical pivotal mounting is obtained which at the same time permits individual removal of the levers without disturbing a great number of the other levers.

It will be noted that the pivoted arms 48 act principally as guiding means for the key stems and could be replaced by any other suitable guiding means. The levers 36 for all of the key stems are mounted upon the same common pivot rod 35 and, therefore, all of the driving elements will be given the same motion for the same key dip, since all of the levers 36 are of equal size.

As explained hereinbefore, the key stems may be readily disconnected from the levers 36 of the driving members so that the removal of any key stem or of other parts is readily performed without the complete disassembly of the machine. By reason of the placing of the lever 20 in the plane of its type bar, and the placing of the link 25 and the lever 29 also in a common plane on corresponding faces of the lever 20 and type bar, the space along the segment required for each type bar and its actuating mechanism will be reduced to a minimum.

It will be obvious that various changes in the details which have been herein described and illustrated for the purpose of explaining the nature of the invention, may be made by those skilled in the art within the principle and scope of the invention, as expressed in the appended claims.

I claim:—

1. In a typewriting machine, a key mechanism, a driving member operated in substantially rectilinear travel by said key mechanism and having a slot therein extending generally in a direction laterally of its direction of movement, a segment, printing mechanism carried by the segment and having an operating arm extending at one end in proximity to said driving member, and a pin on said arm disposed in said slot whereby operation of said driving member from the key mechanism will be transmitted to the printing mechanism through said arm and pin, and whereby said printing mechanism may be moved with the segment to effect a shift in case, said pin sliding in said slot during the case shifting movement of the segment and printing mechanism.

2. In a typewriting machine, a key mechanism, a driving member operated in substantially rectilinear travel by said key mechanism, a segment, printing mechanism carried by said segment and movable therewith to effect a change in case, said printing mechanism having an operating arm extending into proximity to said driving member, said driving member and arm having a pin and slot connection permitting the case shifting movement of the printing mechanism without a disconnection between it and said driving member.

3. In a typewriting machine, printing mechanism, a segment mounting said printing mechanism for movement to vary the case in which the printing mechanism prints, a driving member mounted for substantially rectilinear travel in a direction transversely to the direction of motion of said segment, said printing mechanism having an operating arm extending into proximity to said driving member, said driving member and arm having a cooperating pin and slot driving connection between them permitting case shifting movements of said segment without interruption of the driving connection between the driving member and arm, and means for operating said driving member.

4. In a typewriting machine, printing mechanism, a segment mounting said printing mechanism for movement to vary the case in which the printing mechanism prints, a driving member mounted for substantially rectilinear travel in a direction transversely of the direction of movement of said segment and having a slot extending approximately parallel to the direction of travel of the segment in its case shifting movement, and operating means for said printing mechanism carried by the segment for travel therewith in its case shifting movements and having a pin engaging said slot for transmitting motion from the driving member to the printing mechanism in both of the case printing positions of the segment, said slot permitting movement of the operating means during the case shifting movements without disconnection of the driving connection between the driving member and the printing mechanism.

5. In a typewriting machine, printing mechanism, a segment mounting said printing mechanism for movement to vary the case in which the printing mechanism prints, a driving member having a slot extending in the direction of movement of the segment in its case shifting movement, means including a lever carried by the segment and removably engaging in said slot for normally transmitting motion between the driving member and the printing mechanism in both case shift positions of the segment, and permitting separation of the driving member from the parts carried by the segment during assembly and disassembly of the machine.

6. In a typewriting machine, a segment movable to different case printing positions, a type bar carried by the segment for movement to and from printing positions and movable with the segment to effect a change in the case in which it prints, a driving member movable in a direction substantially normal to the plane of movement of the segment in case shifting operations and having a slot extending approximately parallel to said plane, a lever pivoted to said segment and movable therewith in case shifting operations, having a pin sliding in said slot during the case shifting movements of the segment, and providing a driving connection to the driving member, and means connecting the lever to the type bar for transmitting the motion of the driving member to the type bar.

7. In a typewriting machine, a segment, a plurality of type bars arranged radially thereon, means also carried by the segment for operating the type bar and including a plurality of levers pivoted to the segment for movement in radial planes, a plurality of driving members, said levers having free operating ends bent into planes parallel to the planes of travel of the driving members, and having pin and slot connections with said driving members, whereby motion from said driving members will be transmitted to said bars.

8. In a typewriting machine, a segment, a plurality of type bars arranged radially thereon, means also carried by the segment for operating the type bars and including a plurality of levers pivoted to the segment for movement in radial planes, a plurality of driving members, said levers having free operating ends bent into planes parallel to the planes of travel of the driving members, and having pin and slot connections with said driving members, whereby motion from said driving members will be transmitted to said bars, said pin and slot connections between the driving members and the levers permitting case shifting movements of the segment without interruption of the driving connection between the levers and the driving members.

9. In a typewriting machine, a shifting segment, a type bar pivoted to said segment, a lever of the third order pivoted to said segment and connected to said type bar for operating the same, a second lever pivoted to said segment and having a pin and cam slot connection to said first lever for operating it, and a driving member connected to the second lever to operate the same and permit case shifting movements of the segment independently of the driving member and its driving action upon the second lever, whereby the movements of the driving member will be transmitted to said type bar.

10. In a typewriting machine, a segment, a type bar pivoted to said segment, a lever of the third order pivoted to said segment and connected to said type bar for operating the same, a second lever pivoted to said segment and having a pin and cam slot connection to said first lever for operating it, and a driving member to which the second lever is connected, whereby the movements of the driving member will be transmitted to said type bar, said pin and cam slot connection between said levers causing a positive acceleration of the movement of the first lever throughout substantially the entire printing stroke upon the operation of the second lever by the driving member.

11. In a typewriting machine, a segment, a type bar pivoted to said segment, a lever of the third order pivoted to said segment and connected to said type bar for operating the same, a second lever pivoted to said segment and having a pin and cam slot connection to said first lever for operating it, and a driving member to which the second lever is connected, whereby the movements of the driving member will be transmitted to said type bar, the connection between said second lever and the driving member permitting movement of said lever with the segment in a case shifting operation without breaking the driving connection between them.

12. In a typewriting machine, a segment, a type bar pivoted to said segment, a lever pivoted to the segment for movements in the plane of the type bar, a link connecting said lever and the type bar to cause their concomitant oscillation, a second lever pivoted to the segment in the plane of the link, a driving member for operating said second lever, and means for mounting said segment for movements to effect changes in case, and a connection between the driving member and second lever permitting movement of the levers with the segment without disconnection from the driving member.

13. In a typewriting machine, a type bar, a segment to which the type bar is pivoted, said segment being movable to effect a change in the case in which said type bar prints, a lever carried by the segment and connected to the type bar and movable in a plane parallel to the plane of movement of the type bar, a second lever also pivoted to said segment for movement in a plane parallel to the movement of the other lever and connected to the other lever for operating it, a driving member, means for guiding one end of said driving member for substantially rectilinear motion, and a third lever to which the other end of said driving member is secured, the pivot of the last named lever being so located that the motion of said driving member will be nearly rectilinear, said driving member having a slot extending transversely of its direction of travel, said second lever having a pin engaging in said last named slot and operable by said driving member, said slot permitting movements of said levers with the segment in case shifting operations without interruption of the driving connection to said driving member.

14. In a typewriting machine, a type bar, a segment to which the type bar is pivoted, said segment being movable to effect a change in the case in which said type bar prints, a lever carried by the segment and connected to the type bar and movable in a plane parallel to the plane of movement of the type bar, a second lever also pivoted to said segment for movement in a plane parallel to the movement of the other lever and connected to the other lever for operating it, a driving member, means for guiding one end of said driving member for substantially rectilinear motion, a third lever to which another point of said driving member is secured, the pivot of the last named lever being so located that the motion of said driving member will be nearly rectilinear, said driving member having a slot extending transversely of its direction of travel, said second lever having a pin engaging in said last named slot and operable by said driving member, said slot permitting movements of said first two levers with the segment in case shifting operations without interruption of the driving connection to said driving member, a guiding arm, and a key element pivotally connected to said third lever and said guiding arm for causing motion of said driving member.

15. In a typewriting machine, a key stem, means for guiding one end of said key stem, a lever having a pin and aperture connection to another point of said key stem for also guiding the stem, the free projecting end of said pin being undercut, a locking element having a slot embracing the undercut section of said pin to lock the stem and lever together, and printing means connected to said lever for operation therefrom upon a depression of the key stem.

16. In a typewriting machine, a key having a stem part, a pivoted lever having an arm part, a pin carried by one of said parts and projecting through the other of said parts to pivotally connect the same, the projecting end of said pin being undercut, a locking element having a slot engaging the undercut portion of said pin for preventing separation of said parts, said element being movable out of engagement with the undercut portion to release the parts for separation, and printing mechanism connected to said lever for operation therefrom upon a depression of the key stem.

17. In a typewriting machine, a segment, a type bar pivoted to said segment, a lever pivoted at one end to said segment, means connecting said lever to the type bar to actuate the same when the lever is oscillated, a second lever, one of said levers having a somewhat L-shaped slot therein, the other of said levers having a pin running in said L-shaped slot for effecting a driving connection between them, said pin and slot connection causing a positive acceleration of said first lever throughout substantially its entire printing stroke, whereby said type bar may be operated from said second lever, and driving means for operating said second lever.

18. In a typewriting machine, a segment, a type bar pivoted to said segment, a lever pivoted at one end and connected to said type bar to actuate the same, a second lever having an arm overlapping said lever, one of said levers having an L-shaped cam slot therein and the other of said levers having a pin running in said slot whereby the operations of said second lever will be transmitted to said first lever and said type bar with a positive acceleration of an extent depending upon the shape of said slot substantially throughout its entire driving movement, and driving means for operating said second lever.

19. In a typewriting machine, a segment, a plurality of type bars pivoted to said segment for movement in radial planes, means for operating said type bars, including a plurality of levers pivoted to said segment for movement in radial planes, said levers having their operating arms bent into parallel planes, and a plurality of driving elements mounted for movement in parallel planes, said driving members having operating arms extending for different distances and each operatively connected to an operating lever, whereby when given extents of movement are given to the driving members, equal movements will always be imparted to the type bars.

20. In a typewriting machine, a segment, a plurality of type bars pivoted to said segment for movement in radial planes, operating means for said type bars, including a plurality of levers pivoted on said segment for movement also in radial planes, a plurality of driving members, one for each type bar, mounted for substantially rectilinear travel, said operating levers having their operating arms of substantially equal length and connected to said driving members, whereby when said driving members are given equal extents of travel, they will always cause equal movements of said type bars.

21. In a typewriting machine, a segment, a plurality of type bars pivoted to said segment for movement in radial planes, operating means for said type bars, including a plurality of levers pivoted on said segment for movement also in radial planes, a plurality of driving members, one for each type bar, mounted for substantially rectilinear travel, said operating levers having their operating arms of substantially equal length and connected to said driving members, whereby when said driving members are given equal extents of travel, they will always cause equal movements of said type bars, the operating arms of said levers being bent into planes parallel to the planes of movement of said driving members and having limited universal connections to said driving members.

22. In a typewriting machine, a segment, printing means carried by said segment and having radially arranged operating arms, the free ends of said arms being bent in parallel planes, driving members mounted for substantially rectilinear travel and arranged side by side, said driving members having arms extending therefrom laterally of the direction of movement to different extents, each arm at its free end being connected to one of said operating arms of the printing means to provide an operative connection between them.

23. In a typewriting machine, a segment, a type bar pivoted to said segment, said type bar having a non-circular aperture therein, an operating element for said type bar having a pin non-circular in cross section at its free end and circular at its inner end, whereby said non-circular end may be passed through the aperture of said type bar until the type bar is over the circular portion and then rotated relatively to the type bar to lock the type bar thereon by reason of the movement of the pin out of alignment with the non-circular opening of the type bar.

24. In a typewriting machine, a plurality of levers, and a common support for said levers comprising a plate having a bead along an edge thereof, said plate having a plurality of apertures extending inwardly from the bead and spaced apart lengthwise of the bead, said levers having bearing apertures of approximately the size of the bead with entrance slots leading to said apertures of a width at least equal to the thickness of said plate in the portion bordering said bead, whereby each lever may be attached to said plate by application thereto in a direction endwise of the bead, with the slot in the lever clearing the faces of the plate, by movement of the lever endwise of the bead until the portion of the lever at its slot moves into alignment with a selected one of said apertures, whereupon the lever may pivot freely upon the bead and pass through said aperture with which it is aligned.

25. In a typewriting machine, a plurality of levers, and a common support for said levers comprising a plate having a bead along an edge thereof, said plate having a plurality of apertures extending inwardly from the bead and spaced apart lengthwise of the bead, said levers having bearing apertures of approximately the size of the bead, with entrance slots leading to said apertures of a width at least equal to the thickness of said plate in the portion bordering said bead, whereby each lever may be attached to said plate by application thereto in a direction endwise of the bead, with the slot in the lever clearing the faces of the plate, until the portion of the lever at its slot moves into alignment with an aperture, whereupon the lever may pivot freely upon the bead, and pass through said aperture, said bead having at a point intermediate of its length, a transverse kerf permitting passage of the slot of the lever across the bead at an intermediate point until the aperture of the lever is aligned with the bead, whereupon the lever may be moved in either direction along the bead into a position to pass through one of the slots in said plate.

26. In a typewriting machine, a strip of sheet metal provided with a row of slots elongated in the same direction and transversely of the row, said strip being folded back upon itself along a theoretical line extending lengthwise of said row and crossing said slots intermediate their ends, said strip at the line of fold being looped slightly to form a tubular bearing which is intersected by said slots.

27. In a typewriting machine, a strip of sheet metal provided in its interior with a row of slots elongated in the same direction and transversely of the row, said strip being folded back upon itself along a theoretical line extending lengthwise of said row and crossing said slots intermediate their ends, said strip at the line of fold being looped slightly to form a tubular bearing which is intersected by said slots, a lever in each slot, and a bearing rod extending through said tubular bearing and levers to pivotally and detachably connect the levers to said bearing.

28. In a typewriting machine, a segment, a plurality of type bars pivoted to said segment for movement radially of the segment, means including radially disposed sub-levers for operating said type bars, driving members, one for each sub-lever, the sub-levers having operating ends bent into planes parallel with the planes of movement of said driving members, said bent ends of the sub-levers and said driving members having cooperating pin and slot connections, the pins of said connections being somewhat barrel-shaped providing a limited universal connection between said sub-levers and said driving members.

29. In a typewriting machine, a pair of sheet metal members in a mechanical movement thereof, one of said members having a non-circular aperture therein, the other of said members carrying a pin, non-circular in cross section at its free end and circular at its inner end, whereby said non-circular end may be passed through the aperture in the other member until the latter is upon the circular portion and then rotated to carry the non-circular end out of alignment with the non-circular aperture to lock said members against separation.

30. In a typewriting machine, a segment, printing means arranged radially on said segment and having operating arms arranged radially thereof, a plurality of driving members, one for each printing means, the projecting arms of said printing means being bent into planes approximately parallel to the planes of movement of the driving members, said bent ends and driving members having a limited universal rocking connection between them, and means for operating said driving members selectively.

31. In a typewriting machine, printing mechanism, a segment mounting said printing mechanism for movement to vary the case in which said printing mechanism prints, a driving member having a substantially rectilinear travel, means including a lever carried by the segment and having a readily removable engagement with said member for normally transmitting motion between the member and the printing mechanism in both case shift positions of the segment.

32. In a typewriting machine, printing mechanism, a segment mounting said printing mechanism for movement to vary the case in which the printing mechanism prints, a driving member mounted for substantially rectilinear motion in a direction normal to the case shifting movements of said segment, means including a lever carried by the segment and extending into overlapping relation with said member, said member and lever having a pin and slot connection for normally transmitting motion between said driving member and the printing mechanism in both case shift positions of the segment.

33. In a typewriting machine, a key having a stem part, a pivoted lever having an arm part, a pin carried by one of said parts and projecting through and bearing in the other of said parts to pivotally connect the same, the projecting end of said pin being undercut, a rod pivotally mounting said lever and movable endwise to release said lever, a locking element having a slot fitting the undercut portion of said pin to prevent separation of the lever and stem, said locking element having an aperture through which said pivot rod passes, whereby when said rod passes through the locking element end lever, the locking element will be held against movement in a direction to release the lever from said pin, a release of the locking element being obtained by withdrawing said pivot rod.

34. In a typewriting machine, a plurality of driving elements arranged side by side and mounted for movements of approximate translation and in parallel planes, a segment, printing mechanism arranged radially of said segment and connected to and operated by said driving elements, a plurality of levers arranged side by side in parallel planes and connected individually to said driving elements to actuate the latter, a common pivot rod upon which all of said levers are mounted, and means connected to said levers for operating the same to effect operation of the printing mechanism, whereby equal increments of movement of the levers will produce equal movements of the driving elements and printing mechanism.

35. In a typewriting machine, a plurality of driving elements arranged side by side and mounted for movements in parallel planes, a segment, printing mechanism carried by said segment in radial arrangement and operated by said driving elements, a plurality of levers arranged side by side in planes parallel to the driving elements and pivotally connected to said driving elements to actuate the latter, a substantially straight bearing element having slots in which said levers are received, a common bearing rod passing through said element and levers to provide a common pivotal support for all of said levers, and individual means for rocking said levers to effect individual operation of said driving members.

36. In a typewriting machine, a segment, type bars pivoted on said segment, means also carried by the segment for actuating said type bars and including a plurality of levers pivoted to said segment, and spring buffer means arranged for engagement by each lever at the retracted normal position thereof, whereby the return stroke of each type bar will be cushioned and the rebound tendency of the type bars reduced.

37. In a typewriting machine, a segment, type bars pivoted on said segment, means also carried by the segment for actuating said type bars and including a plurality of levers pivoted to said segment, and spring buffer means arranged for engagement by each lever at the retracted normal position thereof, whereby the return stroke of each type bar will be cushioned and the rebound tendency of the type bars reduced, said buffer means comprising a comb carried by the segment and having spring teeth arranged for engagement by said levers at approximately the ends of their return strokes.

38. In a typewriting machine, a segment, a plurality of type bars pivoted to said segment in a radial arrangement, levers pivoted to the segment for movements in the planes of their respective type bars, links connecting each of said levers with its respective type bars to cause concomitant oscillation of each lever and its type bar, second levers pivoted to the segment in the planes of the links and connected to said first levers to operate them, said second levers having their operating arms bent into vertical planes, and driving members moving in vertical planes for operating said second levers.

39. In a typewriting machine, a driving member, means for guiding said member in a movement of approximate translation, said member having an extension therefrom laterally of its direction of translation, said extension having a slot extending in a direction substantially lengthwise thereof from its free end, and a driven member having a pin extending transversely through said slot.

40. In a typewriting machine, a shifting segment, a driving member mounted for movement in a direction approximately endwise of itself, and having a lateral extension therefrom, said extension having therein, a slot extending in a direction substantially parallel to the plane of shift of the segment to permit the case shift of the segment without material change of the key dip, and a driven member carried by the segment and having an operating pin running in said slot.

41. In a typewriting machine, a segment mounted for case shifting movements, a driving member mounted for movement in a direction approximately normal to the plane of shift of the segment, and having a slot approximately parallel to the case shifting movements, and printing mechanism carried by the segment and having a driving element running in said slot.

42. In a typewriting machine, a shifting segment, a typebar mounted on said segment, an actuating member separately of the segment, means operatively connecting said actuating member and said typebar comprising a pin and slot so disposed and related that in shifting the segment the pin is shifted in the slot while the actuating member remains at rest.

43. In a typewriting machine, driving members arranged side by side parallel to one another in a row and each having independent endwise approximately rectilinear motion, means for operating said members selectively, a shiftable segment extending at an angle to said row, and printing mechanism carried by said segment and including type bars arranged in an arcuate row thereon, said members having laterally projecting portions varying in length from a minimum for the members at the center of the row to a maximum at the sides, said lateral portions having connections to said printing mechanism permitting relative case shifting movements of said segment at an angle to the travel of said members without disconnection of the driving connections between the printing mechanism and said members.

44. In a typewriting machine, driving members arranged side by side and parallel to one another in a row and each having independent endwise approximately rectilinear motion, means for operating said members selectively, an angularly extending shiftable segment, and printing elements carried by said segment and including type bars arranged in an arcuate row thereon, said members having laterally projecting portions varying in length from a minimum for the members at the center of the row to a maximum at the sides, each lateral portion having a slot extending in the direction of shift of the segment, and each printing element having a pin sliding in a slot of a related member and driven thereby, whereby said segment may be shifted for a change of case without interruption of the driving connections from said members to said elements.

In witness whereof, I hereunto subscribe my signature.

JOHN H. BARR.